March 25, 1952 G. D. HAYDEN 2,590,698
ADJUSTABLE BORE GAUGE
Filed April 29, 1947
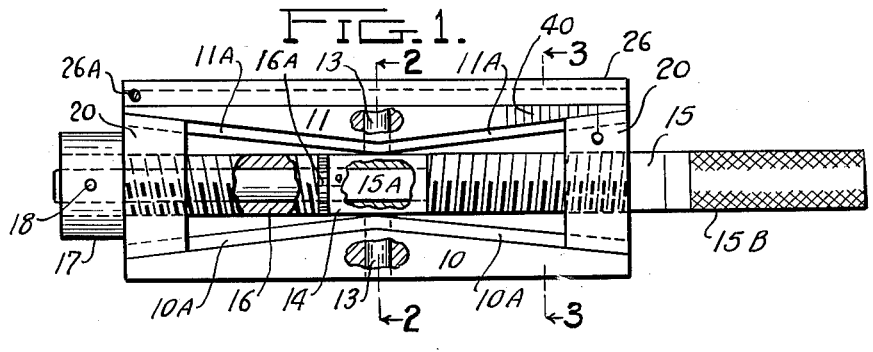
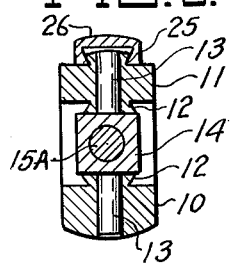
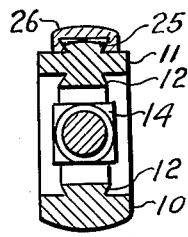
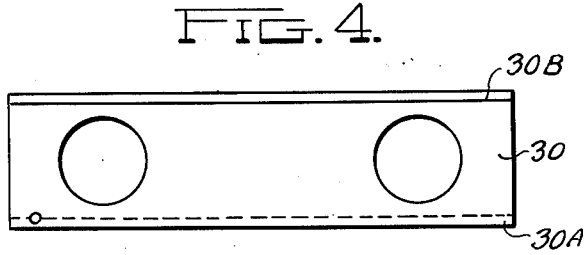
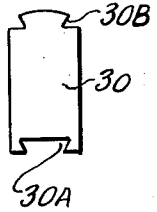
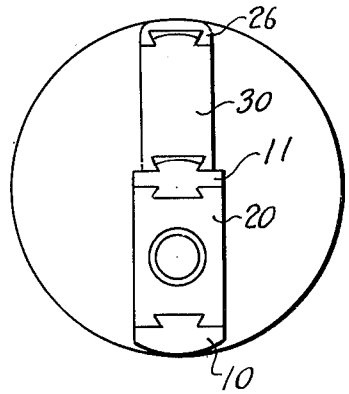
INVENTOR.
George D. Hayden
BY
Hauke & Hardesty
ATTORNEYS Patented Mar. 25, 1952

2,590,698

UNITED STATES PATENT OFFICE 2,590,698

ADJUSTABLE BORE GAUGE

George D. Hayden, Newport, Mich.

Application April 29, 1947, Serial No. 744,587

2 Claims. (Cl. 33—162)

The present invention relates to instruments for internal measurements or distances between two points or walls in many places where exact measurements are inconvenient, such as machine work of many kinds or bored or drilled holes.

In the determination of sizes and of irregularities, such as taper, out-of-round, etc. of bored or drilled holes, the usual shop practice involves the use of calipers, plug gauges and the like.

With plug gauges it is obviously difficult if not entirely impossible to determine anything about the holes other than whether the plug will enter or not. With calipers, an experienced operator can determine approximately the size and shape, but not with sufficient accuracy for purposes.

The present invention has among its objects the provision of a device, the use of which enables an operator to determine with great accuracy the hole size and its condition, i. e. whether it is truly cylindrical.

Another object is to provide an instrument which has a wide range in hole sizes.

Still other objects and advantages will be apparent to those skilled in the art upon reference to the following description and the accompanying drawings in which Fig. 1 is a side elevation of the device with parts broken away.

Fig. 2 is a section on line 2—2 of Fig. 1.

Fig. 3 is a section on line 3—3 of Fig. 1.

Fig. 4 is a side elevation on an expander.

Fig. 5 is an end elevation of the same.

Fig. 6 is a more or less diagrammatic view showing the device with expansion means in use.

As shown in the drawings, the device comprises a pair of bars 10 and 11 provided with straight outer edges and having their inner edges inclined toward the center from both ends. These inner edges 10A and 11A will be provided with dovetails, as shown at 12 in Figs. 2 and 3, and at the apex of the angles produced by the meeting of the inclined portions, will be drilled suitable holes for the reception of pins 13.

The pins 13 are fixed in or integral with a small rectangular bearing block 14 serving as a bearing for the reduced portion 15A of the shaft 15. The shaft 15 on one side of block 14 is threaded as far as the ends of bars 10 and 11 and is extended beyond and knurled as at 15B to provide a suitable handle or means to rotate the shaft.

At the other side of block 14 is an externally threaded sleeve 16, the diameter and threads exactly matching those on the handle end, but being of opposite pitch. This sleeve extends beyond the ends of bars 10 and 11 and upon the extended ends of the sleeve 16 and reduced shaft portion 15A is mounted a collar 17, a pin 18 passing through these parts to fix them against relative rotation and against relative endwise movement.

Mounted upon the threaded shaft and sleeve is a pair of traveling nuts 20, which are preferably of the same thickness as bars 10 and 11, and which are dovetailed to fit the mating dovetails 12 on the bars. Rotation of shaft 15 will therefore cause the nuts 20 to move toward or from the block 14 and thereby move the bars 10 and 11 from or toward each other with parallel movement.

The outer edge or face of bar 10 will be rounded on a radius equal to or less than half the total width of the device and will be hardened and ground. The outer edge or face of bar 11 will be provided with a longitudinal dovetail 25 rounded on its outer face with its radius the same as that of the face of bar 10.

It is, of course, obvious that the outer edge faces of bars 10 and 11 must be parallel and that the edge face of bar 10 be parallel with the edge faces of the later described expander bars.

In using the device, it may be placed in the hole or between the points to be examined, and will be expanded by rotating handle 15B to fit the hole. It may then be withdrawn and measured with a suitable micrometer.

In order to provide for a greater range of hole sizes, a series of expanders such as the one shown at 26 or such as is shown in Figs. 4 and 5 will be used. The expander 26 will be used for a small increment while a series of bars of different widths such as that shown in Figs. 4 and 5 will be used singly or in combinations for other and greater increments. The wider expanders will consist of a bar, such as shown at 30, having dovetails 30A and 30B along two opposite edges of which the dovetails 30A is arranged to coact with the dovetails 25 on bar 11 and the dovetail 30B with the expanders 26. Such arrangement and coaction is indicated in Fig. 6. Of course, with the face of the dovetail 30B rounded as shown, it may be used without the small expander 26. Each of the expanders may be provided with a set screw 26A if desired.

Further, if desired, suitable graduations, such as are shown at 40, may be provided on one of the nuts 20 and one of the bars 10 and 11. And by providing graduations on sleeve 16, as shown at 16A, to indicate fractions of a turn of the sleeve, accurate measurements to .001 inch may be had without resorting to the use of a micrometer.

Now having described the invention and the preferred embodiment thereof, it is to be understood that said invention is to be limited, not to the specific details herein set forth, but only by the scope of the claims which follow.

I claim:

1. An inspection device for bored or drilled holes and for inside measurements consisting of a pair of bars having their outer edge faces parallel, one of said edge faces being provided with a longitudinal dovetail, means for moving said bars toward and from each other while maintaining their parallelism, and an expander bar provided with a mating dovetail along one edge face whereby to fix said expander bar to said dovetailed bar, said expander bar having its outer edge face parallel to the outer edge faces of said pair of bars.

2. An inspection device for bored or drilled holes and for inside measurements consisting of a pair of bars having their outer edge faces parallel, one of said edge faces being provided with a longitudinal dovetail, means for moving said bars toward and from each other while maintaining their parallelism, and a plurality of expander bars of different widths each provided with dovetails along their edge faces whereby they may be fixed to said dovetailed bar in series relation, said expander bars each having its outer edge face parallel to the outer edge faces of said pair of bars.

GEORGE D. HAYDEN.

REFERENCES CITED

The following references are of record in the file of this patent:

UNITED STATES PATENTS

| Number | Name | Date |
|---|---|---|
| 484,813 | Nugent | Oct. 25, 1892 |
| 833,598 | Hansen | Oct. 16, 1906 |
| 953,282 | Nash | Mar. 29, 1910 |
| 1,351,528 | Martin | Aug. 31, 1920 |
| 1,417,001 | Volis | May 23, 1922 |
| 2,254,894 | Johansson | Sept. 2, 1941 |

FOREIGN PATENTS

| Number | Country | Date |
|---|---|---|
| 49,000 | Sweden | Apr. 20, 1921 |
| 136,427 | Great Britain | Mar. 26, 1919 |
| 554,054 | Great Britain | June 17, 1943 |